United States Patent [19]

Hooson

[11] Patent Number: 5,577,631
[45] Date of Patent: Nov. 26, 1996

[54] SELF-FILLING PAIL

[76] Inventor: Kenneth A. Hooson, 40467 NYS Rte. 12, Clayton, N.Y. 13624

[21] Appl. No.: 537,544

[22] Filed: Oct. 2, 1995

[51] Int. Cl.$^6$ .................................................... B67D 5/00
[52] U.S. Cl. ............................................ 220/603; 220/768
[58] Field of Search ................................... 220/603, 774, 220/768, 765

[56] References Cited

U.S. PATENT DOCUMENTS

| 610,285 | 9/1898 | Scoles | 220/603 |
|---|---|---|---|
| 785,101 | 3/1905 | Hopkins | 220/603 |
| 2,632,319 | 3/1953 | Adrian | 220/603 |
| 2,671,326 | 3/1954 | Pickering et al. | 220/603 |

Primary Examiner—Joseph M. Moy
Attorney, Agent, or Firm—Robert O. Wright

[57] ABSTRACT

A pail having a bail pivotally mounted adjacent the open top that will automatically tilt over on its side and fill with liquid when dropped into a body of liquid is shown. The full pail may be retrieved from the body of liquid by attaching a line to the pivotally mounted bail. A weight of predetermined size attached to the lip of the pail provides the destabilizing effect necessary to tilt the pail but does not substantially affect the full or empty stability of the pail out of the body of liquid.

7 Claims, 5 Drawing Sheets

SELF-FILLING PAIL

This invention relates to pails and more particularly to a pail that when dropped into a body of water will automatically fill with water.

BACKGROUND OF INVENTION

In using a pail of the conventional type which is generally frusto-conical in shape and has a bail pivotally mounted adjacent the lip of the open top, it is frequently desired to fill the pail from a body of fluid such as water and to remove the pail filled with water for use elsewhere. When an empty pail of the conventional type is dropped into a body of water for instance it will frequently merely float in an upright position and not fill. Repeated attempts to throw or otherwise project the pail into the water in a sideways orientation are frequently necessary in order to obtain a pailfull of water. Boaters wishing to swab down their decks are well acquainted with this phenomenon, as are others such as those seeking water from a shallow well and the like.

PRIOR ART

Various solution to this problem have been proposed in the past such as shown in U.S. Pat. Nos. 897,324 to Hinshaw and 3,994,522 to Terry. A valve in the bottom of the pail as shown in the art only partially solves the problem. Valves are costly to manufacture and maintain sometimes leaking or otherwise not working. Also a practical valve is generally small and limits the speed with which the bucket may be filled.

OBJECTS AND SUMMARY OF INVENTION

Accordingly it is an object of the present invention to provide a pail that can be easily filled from a body of water thus overcoming the limitations of the prior art.

It is another object of the present invention to provide a self-filling pail.

It is another object of the present invention to provide a pail that will automatically tilt to a horizontal position when dropped into a body of water and quickly fill.

It is another object of the present invention to provide a pail that when placed on a body of fluid automatically tilts to a horizontal position when empty to facilitate filling and assumes a vertical position when full and removed from the body of fluid.

It is a further object of the present invention to provide a self-filling pail that has all the attributes of a similar standard pail whether full or empty when used for all other purposes except filling from a body of water.

It is a further object of the present invention to provide a pail that can be used to remove and handle a quantity of noxious liquid from a body of same without direct human contact.

It is a still further object of the present invention to provide a method and means for making a pail self-filling.

These and other and further objects are accomplished in one embodiment in which a weight is attached to the lip of a pail at a point midway between the attachment points of a pivotally mounted handle or bail that will cause the pail to tilt approximately twenty degrees from the vertical when hung in air by a line attached to the center of the bail.

DESCRIPTION OF PREFERRED EMBODIMENT

Figure 1:
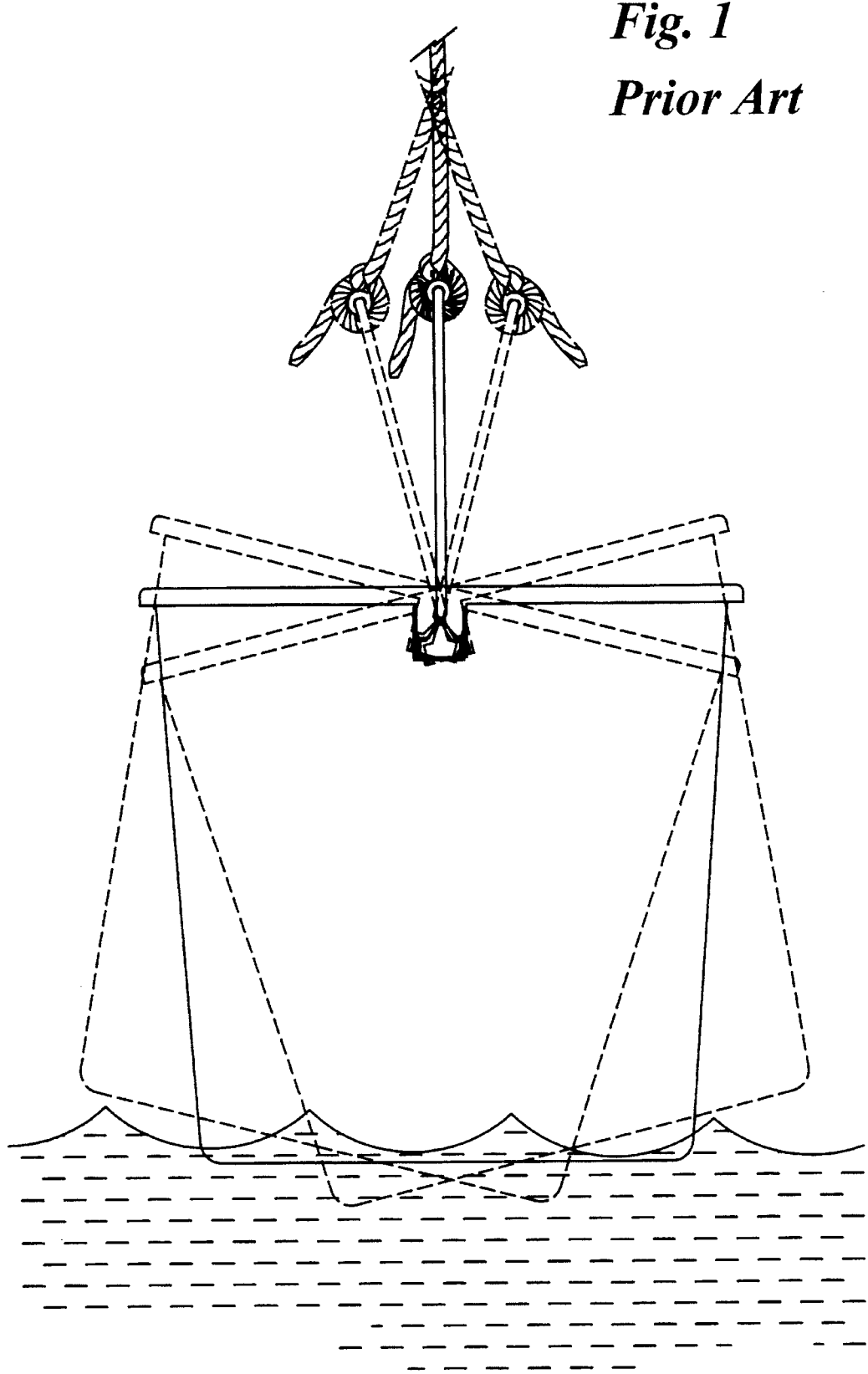
FIG. 1 is a side view of a prior art pail bobbing in a body of water and refusing to fill.
Figure 3:
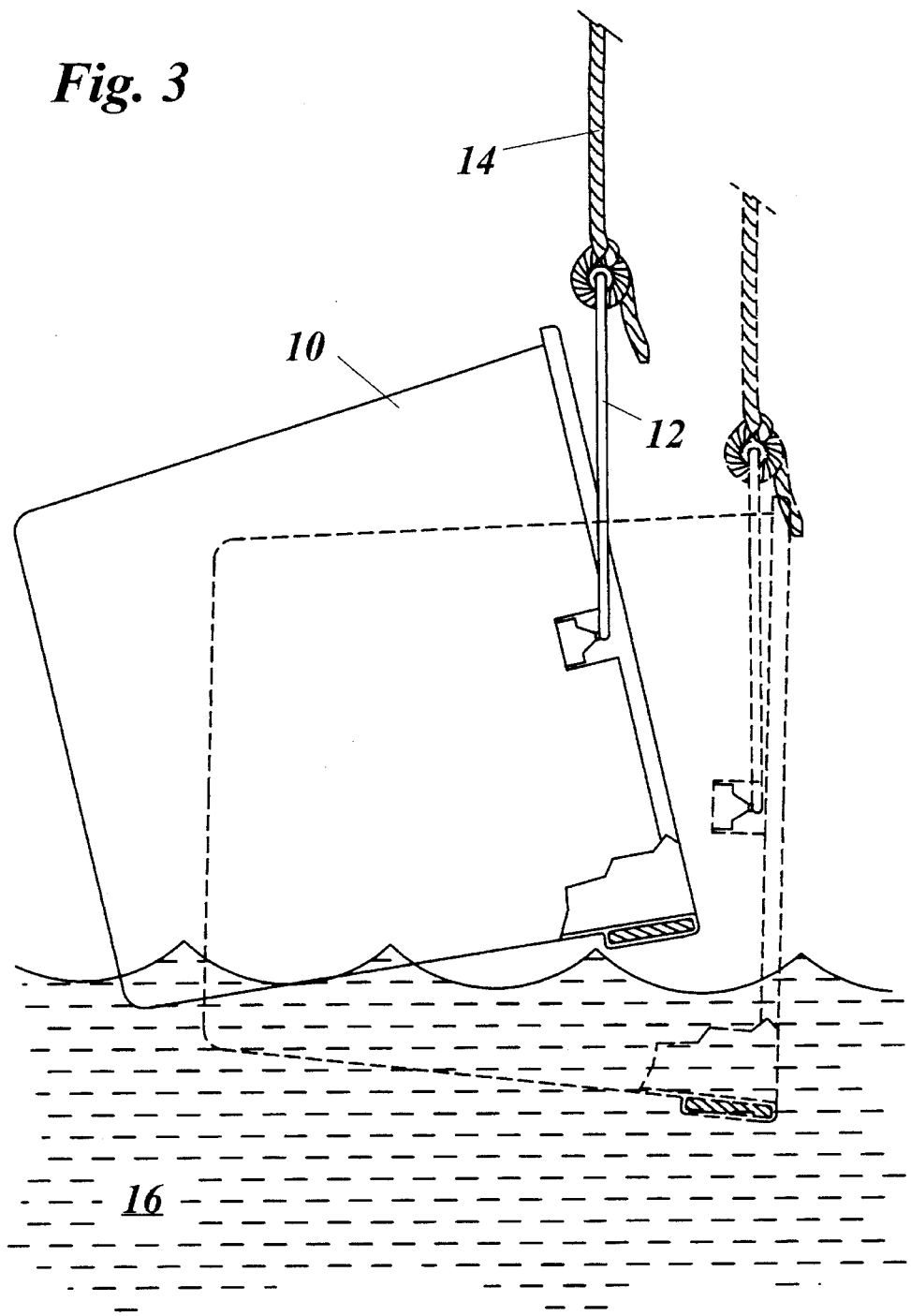
FIG. 3 is a view similar to FIG. 1 showing a pail according to the present invention tipping over and filling with water as it is dropped into a body of water.

Referring now to FIG. 1 there is shown a typical prior art frusto-conical pail bobbing in the "no-fill" position so often encountered by boaters and other trying to obtain a pail of water from a lake for instance. FIG. 3 on the other hand shows the pail 10 of the present invention in a similar situation automatically tipping over and submerging into the body of water 16 so that upon retrieving the pail 10 by lifting on the line 14 attached to bail 12 a full pail of water is lifted from the body of water 16.

Figure 2:
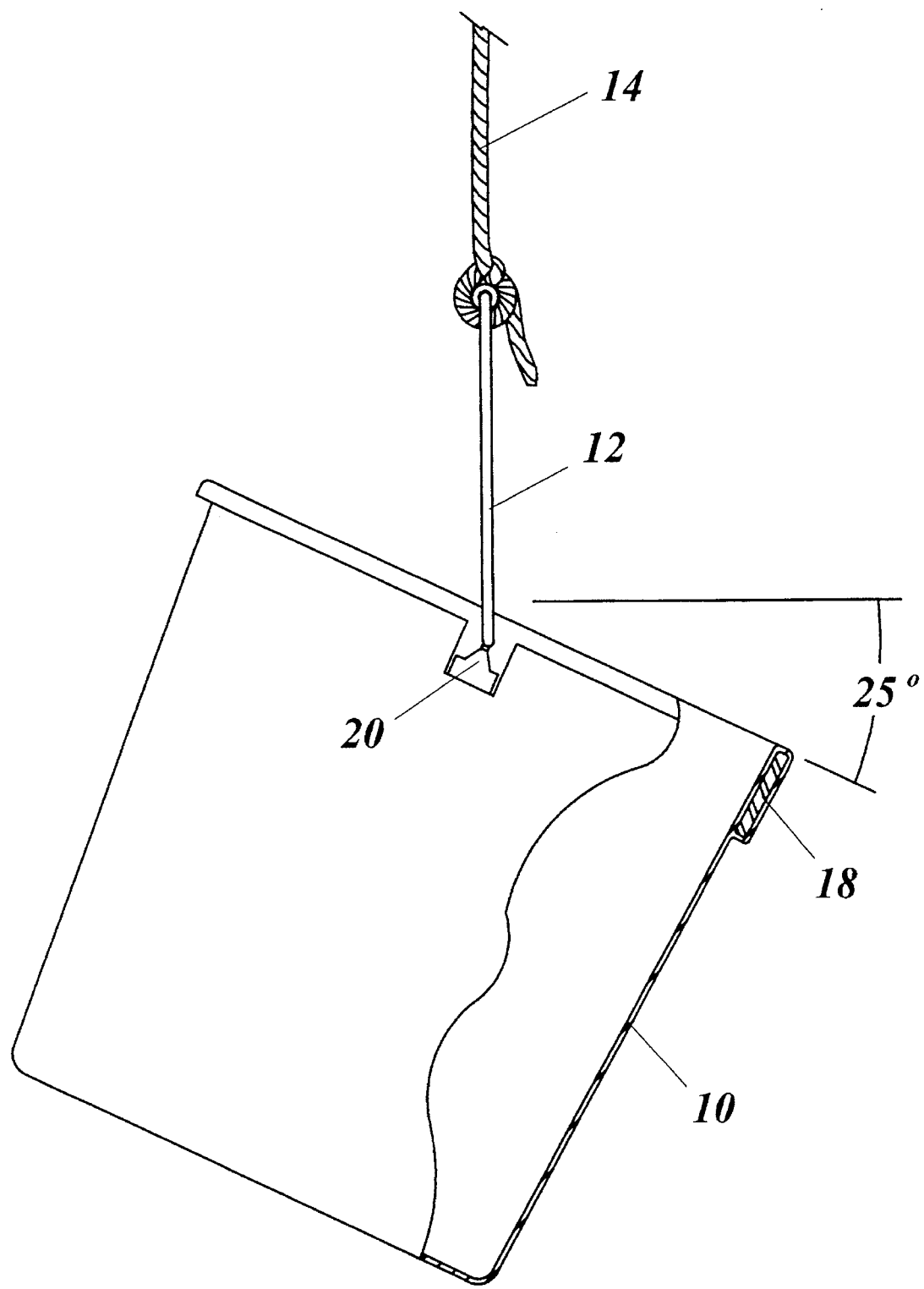
FIG. 2 is a side elevation of a pail according to the present invention suspended from a line attached to the center of the bail.

As may be seen in FIG. 2 a weight 18 is attached to the lip of the pail 10 at a point approximately midway between the attachment points 20 of the bail 12. Weight 18 is shown attached to the outer surface of the sidewall of the pail 10 so as not to interfere with fluid ingress or egress.

Weight 18 may be made of any high density material such as lead, steel, plastic or other as desired for the particular application. The size of weight 18 is chosen relative to the weight of the bucket 10 so as to provide between twenty and thirty degrees of tilt of the pail axis when suspended in air by the line 14 and bail 12 as shown in FIG. 2. It has been found that this is sufficient to ensure that the pail 10 will automatically fall over as shown in FIG. 3 and fill with water when dropped into a body of water. This permits easy, complete and rapid filling of the pail 10.

Figure 4:
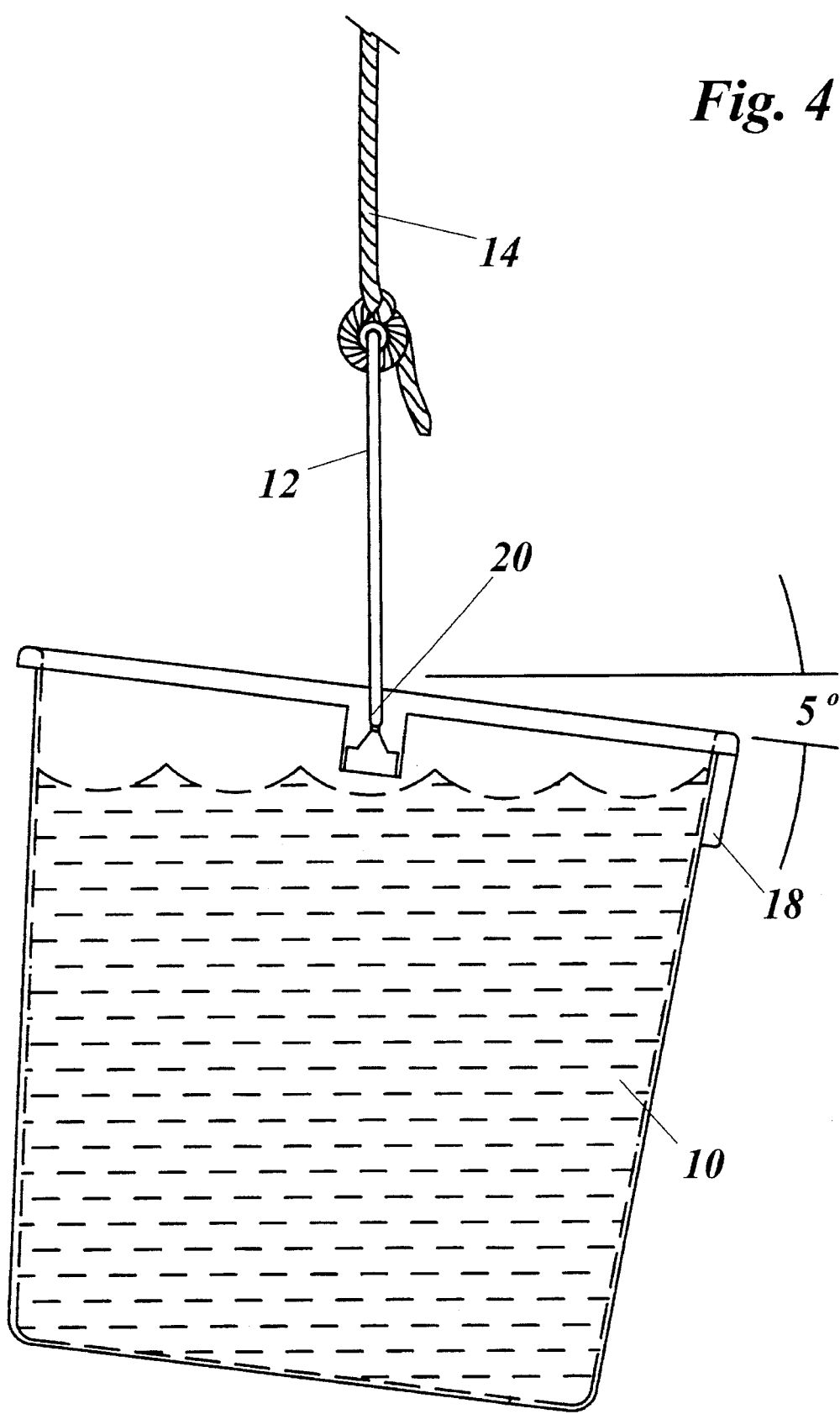
FIG. 4 is a view similar to FIG. 2 with the pail full of water.

Depending on the particular shape and material the pail is made from more or less weight may be required. Generally it has been found that the weight 18 should be between 20% and 45% of the weight of the pail. With a cylindrical pail (not shown) 50% may sometimes be required to ensure easy tipping. It has been found desirable to keep the weight to a minimum so as not to upset the normal balance and stability of the pail either empty or full. The ranges given above have been found to be satisfactory for most conventional pails and as shown in FIG. 4 weights within these ranges will result in a tilt of less than 5 degrees when the pail 10 is at least half full of liquid and suspended in air by line 14. Even when set down on a flat solid surface empty pails according to the present invention will not tip over. The proper amount of weight for a particular pail is a function of the weight, the shape, and the attachment point of the bail, of the pail. Also the weight of the bail must sometimes be taken into account.

Weight 18 is preferably made in the shape of a small flat sided bar or tube with rounded edges so as to present the least possible interference during use of the pail. A small vertical dimension for the weight will also assist in stacking of one pail in another pail.

Figure 5:
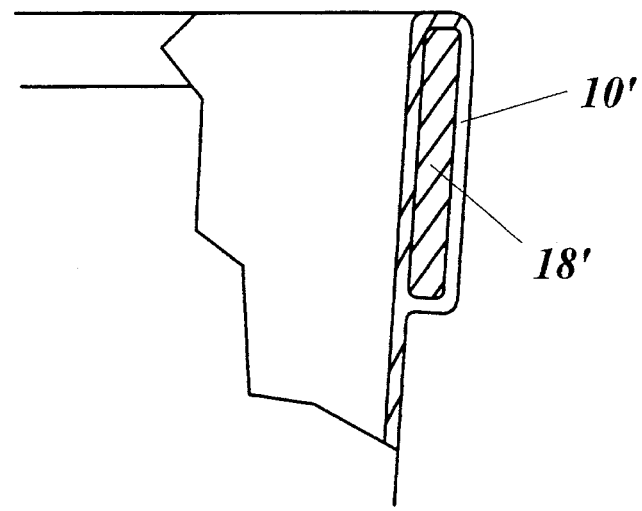
FIG. 5 is a partial cross sectional view of the lip of the present pail taken through a self-filling weight.
Figure 6:
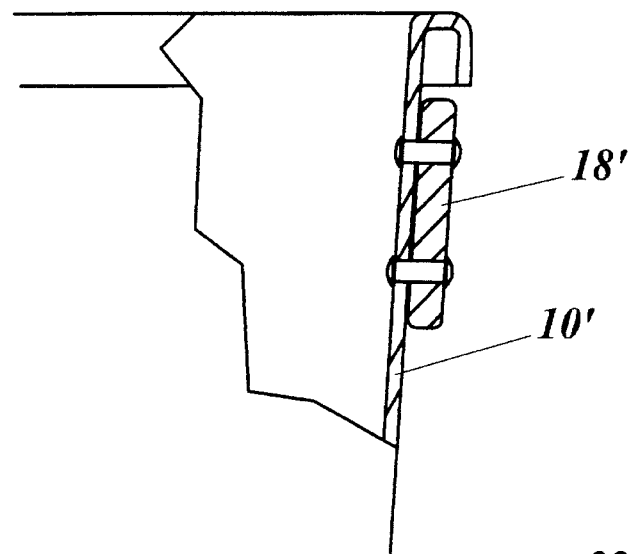
FIGS. 6 and 7 are views similar to FIG. 5 showing additional embodiments of the present invention.
Figure 7:
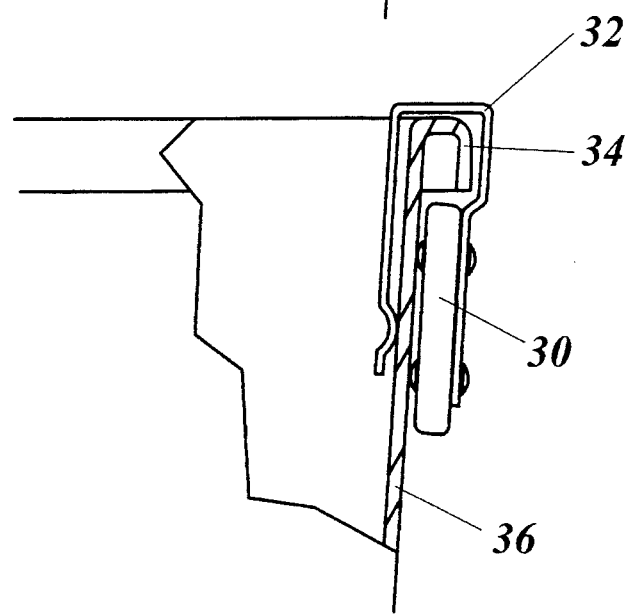

Referring now to FIGS. 5–7 the weight 18 may be encapsulated within the wall of the pail as shown in FIG. 5. This is particularly so when using injection molded plastic pails. FIG. 6 shows a steel weight 18' riveted to a metal pail 10'.

In FIG. 7 there is shown another embodiment of the present invention in which a weight 30 of a desired size and shape is secured to a clip 32 having sufficient elastic memory to permit it to be forced over the rim 34 of a pail 36 and retain the weight 30 in the desired position. Weight 30 can be made in a variety of sizes suitable for different size and weight pails and applied as desired to convert a conventional pail to a self-filling pail according to the present invention.

For purposes of easy explanation and understanding I have shown and described the pail 10 as being used to obtain water from a lake. I also have found that this invention is particularly useful for handling hazardous and noxious fluids without direct human contact. Sampling, removal and handling of such liquids can be accomplished by using a pail made of the proper material to contain the noxious fluid in question and made self-filling according to the present invention.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use. This application is intended to cover any modifications and changes as may come within the scope of the following claims.

What is claimed is:

1. A pail for withdrawing and containing a quantity of an hazardous fluid from a body of said fluid which comprises:

a body portion having a bottom, sidewalls extending upwardly from said bottom forming an enclosed space, and an open top;

an integral lip portion formed about the edge of said open top;

said body and lip portions being formed of a material suitable for containing said hazardous fluid;

a bail member pivotally mounted on said sidewalls of said body portion;

a destabilizing member positioned on said sidewalls adjacent the top edge thereof;

said destabilizing member being completely encapsulated within said lip portion;

said destabilizing member having sufficient weight relative to the weight of said body portion to cause said pail to tip over when placed vertically upright in (a) an hazardous fluid;

whereby when said pail is placed on the surface of (a) an hazardous fluid said pail will tip over to a sideways position and fill with hazardous fluid without said fluid contacting said destabilizing member.

2. A pail according to claim 1 wherein said destabilizing member weight is chosen so as to create a tilt of approximately 25 degrees in the axis of the pail when said pail is empty and hung in air by a line attached to the center of said pivotally mounted bail.

3. A pail according to claim 1 wherein said bail member is mounted at a point, on said sidewalls of said body portion, and said destabilizing member weight both are chosen so as to create a tilt of between 20 and 30 degrees in the axis of the pail when said pail is empty and hung by a line attached to the center of said bail and a tilt of less than 5 degrees when said pail is at least half full of fluid.

4. A pail according to claim 1 wherein said pail is formed of plastic and said destabilizing member is molded in the lip of said pail open top.

5. A self-filling pail for withdrawing and containing a quantity of water from a body of water which comprises:

a frusto-conical pail including a circular generally flat bottom, and sidewalls forming an open top having a circular lip portion with a diameter larger than the diameter of said bottom;

a generally semicircular bail member pivotally mounted at the ends of a diameter of said lip portion of said pail; (and)

a weight member positioned on the sidewall of said pail adjacent said circular lip portion at the end of a diameter thereof;

said weight member having sufficient weight relative to the weight of said body portion to cause said pail to tip over when placed vertically upright in a body of water;

said weight member being completely encapsulated within said lip portion;

whereby when said pail is placed in a vertical position with its bottom on the surface of a body of water said pail will tip over to a sideways position and fill with water without said water contacting said weight member.

6. A pail according to claim 5 wherein said weight member is formed of lead and encapsulated within the lip portion of said pail.

7. A pail according to claim 5 wherein said bail member is mounted at a point, on said sidewalls of said body portion, and said weight member both are chosen so as to create a tilt of between 20 and 30 degrees in the axis of the pail when said pail is empty and hung by a line attached to the center of said bail and a tilt of less than 5 degrees when said pail is at least half full of water.

* * * * *